G. F. RICHTER.
WOUND CLIP FORCEPS.
APPLICATION FILED JULY 22, 1913.
1,203,269.
Patented Oct. 31, 1916.
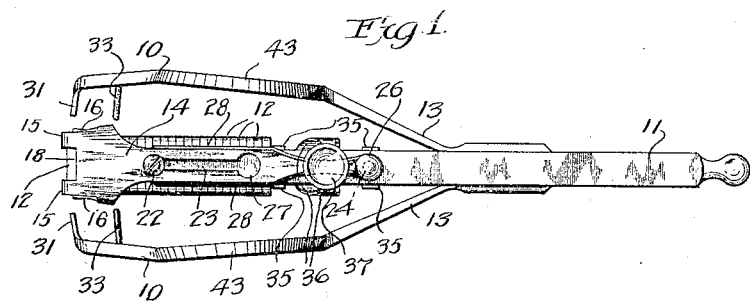
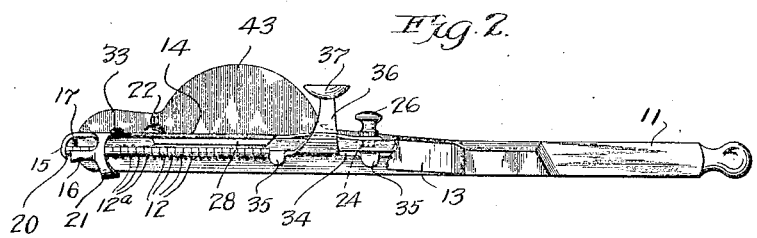
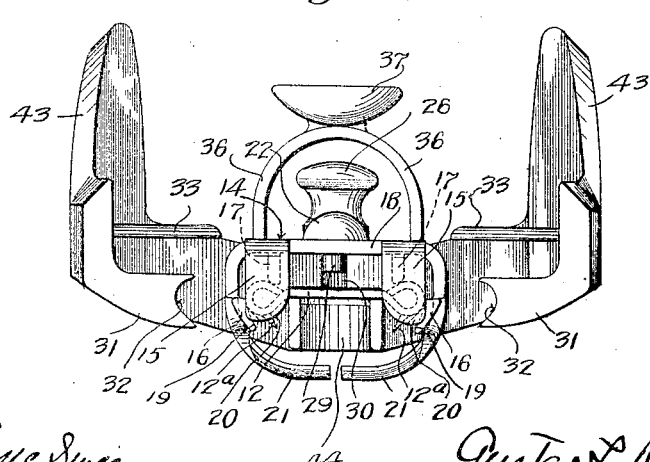
WITNESSES
Joseph McSweeny
Frank Whitelaw
INVENTOR
Gustav F. Richter
BY
ATTORNEY G. F. RICHTER.
WOUND CLIP FORCEPS.
APPLICATION FILED JULY 22, 1913.
1,203,269. Patented Oct. 31, 1916.
2 SHEETS—SHEET 2.
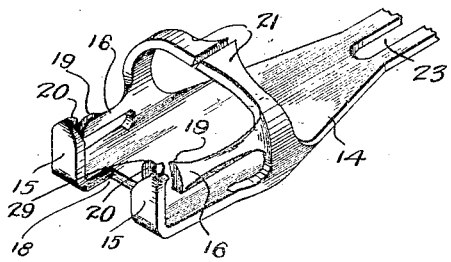
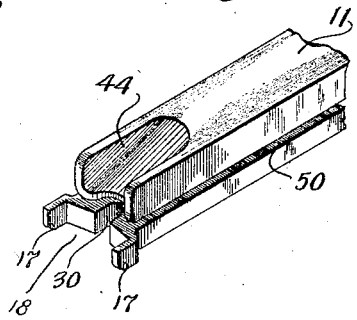
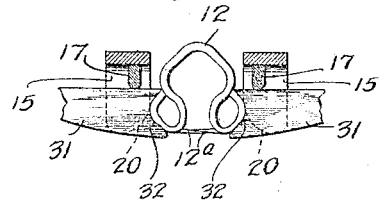
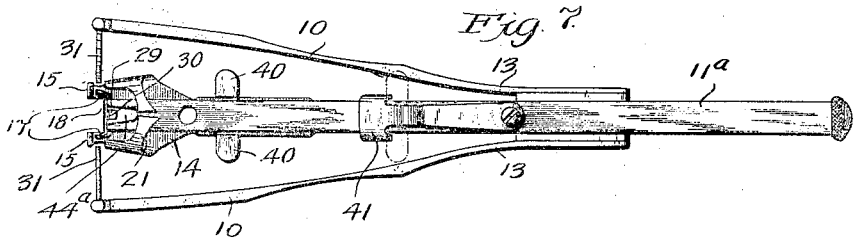
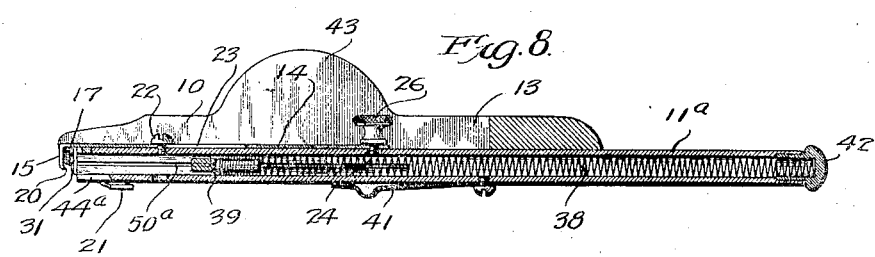
WITNESSES
INVENTOR
BY
ATTORNEY

UNITED STATES PATENT OFFICE.

GUSTAV F. RICHTER, OF BROOKLYN, NEW YORK.

WOUND-CLIP FORCEPS.

1,203,269.  Specification of Letters Patent.  Patented Oct. 31, 1916.

Application filed July 22, 1913. Serial No. 780,483.

*To all whom it may concern:*

Be it known that I, GUSTAV F. RICHTER, a citizen of the United States, residing in Brooklyn, in the county of Kings and State of New York, have invented the following-described Improvements in Wound-Clip Forceps.

This invention is an improved construction of magazine wound-clip forceps, the object being to provide a simple, durable and reliable instrument, avoiding as far as possible the use of moving or delicate parts such as might render the instrument liable to derangement; and in which the clips are fed with precision to the forceps members regardless of the position or inclination at which the instrument may be held, and further to provide an instrument of few parts which are readily disassembled for sterilizing or for introducing the wound-clips.

With these ends in view the invention comprises the construction, arrangement and combination of parts herein exemplified and more particularly pointed out in the claims, it being understood that the embodiments of the invention herein shown have been selected as illustrative and that numerous changes may be made without departing from its scope, although the forms shown are, at the present time, the preferred forms.

In the drawings: Figure 1 is a top plan of the device; Fig. 2 is a side view with one of the forceps members broken away; Fig. 3 is a front view on an enlarged scale showing a clip in position to be engaged by the forceps members; Fig. 4 is an inverted perspective view on an enlarged scale of the forward portion of the removable holding and positioning structure; Fig. 5 is an inverted perspective view on an enlarged scale of the forward part of the clip guide; Fig. 6 is a sectional view taken near the end of the device, showing the forceps members in the act of bending a clip; Fig. 7 is a bottom plan view of an illustrative construction; and Fig. 8 is a vertical longitudinal section through this form of the invention.

The device comprises a pair of forceps members or blades 10, and a central, relatively stationary rigid bar 11, the latter constituting a clip magazine and guide, along which the wound-clips, designated 12, are advanced, successively, to the point where the forceps members may operate upon them. The forceps members are permanently fixed at their rear ends to the sides of the central bar 11, and their portions 13, which diverge therefrom, are thin and springy, so that the forceps members may be compressed toward the central bar, to spring outward again when released.

The wound-clips 12 are formed of strips of ductile metal bent at the ends to form loops or eyes, from which penetrating points or prongs $12^a$ are struck up; such clips are well known to surgeons. To receive these clips, the central member 11 is longitudinally and horizontally slotted with a straight slot or channel, as shown at 50 (Figs. 5 and 8) extending from about its middle portion forward to its front end, and the clips are inserted in this slot, with their eye or end portions projecting laterally from the bar (as shown in Fig. 1), and their pointed prongs directed downwardly, the width of the bar being preferably substantially equal to the length of the straight portion of the clips, so that the latter will not tilt sidewise and cramp. The said bar thus constitutes both a magazine guide for the clips and a handle or support for the forceps members. At or beyond the end of this bar, devices are provided for arresting the advance of the foremost clip and retaining it in a proper relation independent of the guide slot, in which position it will be subject to compression and bending by the approaching forceps members, so as to be affixed to the wound thereby. In the particular construction shown, these means are for the most part embodied in a detachable piece 14, but this may be varied, the main object being to make provision for limiting the forward movement of the clip after it leaves the guide and for keeping it from premature displacement in any direction, while affording such clearance space as may be necessary to permit it to be bent and applied to the wound. Preferably there are two laterally spaced limit stops 15, located slightly more than a clip's width in advance of the lower clip-supporting portion of the clip guide 11; and, as shown, these stops are formed as down-turned lugs on the forward end of the detachable piece 14. There are also side portions 16, to engage the ends of the clip and hold it against endwise movement, and preferably these side portions are so constructed as to accommodate themselves to clips which may vary slightly in length or form and to guide them laterally and center the successive clips as they are advanced against the limit stops. Thus, they are shown in the form of forwardly converging fingers, the rear portions of which are spaced away from the sides of the central member 11 far enough to clear any clip, while their forward ends approach each other sufficiently to clasp a clip endwise with a slight spring pressure. While these fingers may be resilient and somewhat yielding if desired, they are preferably made fairly stiff and rigid, and the spring pressure just mentioned is provided by the natural resilience of the clip itself.

In addition to the foregoing provisions, there are also means for holding the foremost clip against upward dislodgment, and for this purpose I employ the laterally spaced lugs 17 which project forward from the end of the upper portion of the slotted clip guide 11. These lugs touch and steady the top of the clip adjacent the ends when the latter is in position to be affixed to the lips of the wound, and in such manner as to afford free clearance for the upward bending of the clip, as shown in Figs. 3 and 6; and for the same purpose the forward portion of the detachable piece 14, between the limit stops 15, is open or recessed, as shown at 18. The lugs 17 are located immediately behind the said limit stops, and the general arrangement of retaining and positioning devices is designed with a view to the holding of the clip solely by its end or eye portions. Thus, the limit stops engage such end portions at the front, the lugs 17 at the top, and the fingers 16 at the sides. The secure support of the clip in this position is further assured by a slight under-curving of the tips of the fingers 16, as indicated at 19, and also of the tips of the limit stops 15, as indicated at 20. While the clip is thus firmly sustained against falling out of the holding devices, the space between the prongs 12$^a$ is wholly open and unobstructed, in such manner as to enable the clip to embrace the lips or edges of the wound with facility.

In the particular construction shown the detachable retaining member 14 is in the form of a slide which lies along the top of the clip magazine 11, having the limit stops 15 extended downward from its forward end and the fingers 16 cut out from downward bent side portions spaced away from the sides of the magazine. The said side portions are extended around the member 11 in the form of arms 21, which meet beneath the arm and form a reinforcement to the side members of the magazine preventing spreading thereof, so that they will not interfere with the use of the instrument. The retaining device 14 is held removably on the clip guide by a stud or screw 22 threaded into the top of the guide and occupying a slot 23 in the said device, which slot is enlarged at 27 so as to pass over the head of the stud and allow the latter to enter the slot. The device is put in place on the guide by drawing it along the stud by the handle member 26 until a detent 24 (directly beneath the handle) snaps into a hole in the bar 11. The device will then be in operative position. In order to detach the device, its rear, blade-like portion is sprung up and disengaged from the hole, by pulling on the handle 26, and it is then pushed or slid forward until the enlargement 27 at the rear end of the slot 23 again comes beneath the head of the screw 22, when the part is free to be removed. For further accuracy of placement and insurance against displacement, the retaining device is provided with down-bent side flanges 28, which closely embrace the sides of the member 11, and also with a downward terminal projection 29 which fits into a notch or seat 30 cut in the forward end of the upper part of the said member. The said part 14, whether constituted of some or all of the elements above described, can be secured in place in other ways, but it is, in any event, desirable to provide it with more than a single means for securing and alining it with the magazine slot and the forceps.

The operative portions of the forceps members 10 are prongs 31 which project inwardly in opposed relation, at the forward end of the said members and magazine slot. The ends of these prongs are notched, as shown at 32, and engage the end portions or eyes of the foremost clip immediately adjacent to the points at which the fingers 16 engage the same, and by endwise pressure applied thereto, serve to effect the bending or buckling of the clip which causes the penetrating points 12$^a$ thereof to approach or pass each other and thus catch in and draw together the lips of the wound. The prongs 31, it will be observed, are adapted to enter spaces left in the clip-retaining device 14 at the forward end of the guide, and in so doing pass behind the limit stops 15 and in front of the fingers 16, sufficient spaces being left for the purpose. In order to steady and aline the clip-bending parts in their approaching movement the forceps members may be provided with inward-extending guide projections 33, which can slide over the central member 11, or the part 14 thereon.

The means for advancing the clips along the magazine or guide slot to operative position with reference to the clip-sustaining and clip-bending members, may be either manual or automatic, by means of a spring. Figs. 1 to 3 show a manual or finger push arrangement, while Figs. 7 and 8 show a spring pusher construction. The finger push consisting simply of a small plate 34 inserted in the guide slot 50, the section of which it snugly fills, with down-bent lateral guide lugs 35 and upward extended yoke arms 36, which at their upper ends carry a button or handle 37. This device can be pushed along the slot so as to move the column of clips forwardly.

In Figs. 7 and 8, the member 11ª is hollow as well as slotted, so as to contain a spiral spring 38, which bears against a follower or pusher 39 also contained inside the member and having lateral extensions 40, which project outside the slots 50ª in the side walls of the said hollow member or tube. These extensions contact with the side portions of the detachable piece 14 when the last clip has been advanced into the holding and positioning devices, so that the follower is kept from being pushed out of the hollow central member and is detained in a position where it can be conveniently grasped and moved bockward. When it is thus slid backward the extensions are caught behind an automatic spring latch 41, which restrains the follower while the magazine is being reloaded with clips. Release of this catch by the fingers causes the spring 38 to force the follower against the rear end of the row of clips and thus advance the foremost one against the limit stops 15 in the same manner as the finger push except that it is done by the action of the spring. As shown, the said spring may be confined at the rear end by a plug 42 screwed into the end of the tubular central member 11ª.

In operation, the forceps are held with the rearward-projecting or handle portion of the central member 11 or 11ª grasped between the fingers and palm of the hand in a natural manner, while the thumb and forefinger press against the widened portions 43 of the forceps members. A clip being in position in the retaining devices at the forward end of the magazine the forceps members are compressed so as to bend the clip, the points of which are thereby caused to penetrate and draw the lips of the wound together. This produces something of a ridge in the flesh, and an important part of the invention not heretofore pointed out consists in recessing the central member 11 or 11ª, as shown at 44 and 44ª, to accommodate this ridge and thereby facilitate the operation of presenting the clips to the wound. The instrument may be held at a comparatively low angle to the surface operated upon and is preferably moved backward along the wound. The manual pusher device is used after each clip bending action to feed the next clip forward, while in the spring actuated construction the feed is performed automatically, as soon as the terminal clip has been affixed to the wound. In either event the devices at the forward end of the magazine accurately position and securely hold the foremost clip, which has been pushed off the central support, until it is bent by the forceps members and left behind in the lips of the wound. Moreover in both forms, the part of the pushing mechanism which engages or immediately follows the last clip in the row is arranged to enter between the forceps members, when all the clips have been exhausted, and by its relatively greater stiffness, and refusal to bend, give an immediate indication to the operator that the supply of clips has been used up. More clips can then be inserted by removing the part 14 and inserting the clips from the front end of the clip guide, in an obvious manner.

It will be observed that the construction is such that clearance is provided at the back and under side of the foremost clip, between holding means at the end of a stationary magazine wherein the clips are guided in edgewise alinement, the said clearance permitting the bending and application of the clip without the necessity of any movement on the part of the magazine and in plain view of the operator. In the particular embodiment of the invention illustrated herein the clip-retaining and positioning elements are mounted on the end of the stationary magazine and the forceps members are moved relatively thereto. In my copending application, Serial Number 871,438, filed November 11, 1914, I have disclosed and claimed another form of this generic construction, which differs from the present embodiment in that clip-retaining nibs are formed on the forceps members themselves, the latter being arranged so that the nibs are normally in position at the end of the magazine to receive and hold the foremost clip in readiness for bending.

What is claimed as new is:

1. Wound clip forceps comprising, in combination, a relatively stationary central longitudinal magazine clip guide adapted to receive and guide the clips in edgewise alinement, forceps members and retaining means at the forward end of the magazine for engaging the end portions of the foremost clip so as to provide clearance at the back and under side of the said clip, permitting the bending and application thereof.

2. Wound clip forceps comprising, in combination, a relatively stationary central longitudinal magazine clip guide adapted to receive and guide the clips in edgewise alinement, retaining and positioning elements mounted on the forward end of the magazine and constructed to hold the foremost clip at its ends, leaving clearance above and below the same, permitting its bending and application to a wound, and forceps members mounted for swinging movement on the magazine relatively to the same and to the retaining and positioning elements.

3. Wound clip forceps comprising, in combination, a relatively stationary straight central longitudinal magazine clip guide adapted to receive and guide the clips in edgewise alinement, forceps members and retaining means at the forward end of the magazine for engaging the end portions of the foremost clip so as to provide clearance at the back and under side of the said clip, permitting the bending and application thereof.

4. Wound clip forceps comprising forceps members and a relatively stationary central magazine clip guide, the latter having a guide-way receiving the backs of the clips, and holding means at the front of said guide constructed and arranged to receive the foremost clip and afford clearance space above and below the guide-way permitting the bending and application of such clip by compression of the forceps members.

5. Wound clip forceps comprising a relatively stationary part embodying a central longitudinal magazine clip guide adapted to hold and guide the clips in edge to edge series with their prongs at the under side of the series, and clip-affixing members carried by the stationary part and operative in fixed relation to the forward end of the magazine to bend and apply the foremost clip.

6. Wound clip forceps comprising a relatively stationary part embodying a central longitudinal magazine clip guide adapted to hold and guide the clips in edge to edge series with their prongs at the under side of the series, in combination with means at the front end of the guide for arresting and holding the foremost clip of the series in position to be collapsed and applied to the wound, and means carried by the stationary part for collapsing the clip thus held.

7. A device for applying wound clips, comprising a central longitudinal relatively stationary member having means for holding and guiding the clips in edge to edge series with their prongs at the under side of the series, and clip-applying forceps members mounted on said stationary member and operative in fixed relation to the forward end of the clip-guiding means, the said device having means separate from and in advance of the guiding means for arresting and holding the foremost clip in position to be collapsed and applied to the wound.

8. Wound clip forceps comprising, in comprising a relatively stationary part having means for holding and guiding the clips in edge to edge series with their prongs at the under side of the series, clip-affixing forceps members carried by the stationary part and operative in fixed relation to the forward end of the clip guide, the clip guide being centrally and longitudinally disposed with respect to the forceps members, and means separate from the forceps members and located at the forward end of the guide for positioning the foremost clip in operative relation to said members.

9. A device for applying wound clips, comprising a relatively stationary part embodying a central longitudinal clip magazine adapted to hold and guide the clips in edge to edge series with their prongs at the under side of the series, and clip-bending forceps members carried by the stationary part and operative in fixed relation to the forward end of the magazine, the said device having means for arresting and positioning the foremost clip and permitting the same to collapse in a plane transverse to the magazine.

10. A device for applying wound clips, comprising a magazine clip guide and clip affixing means, in combination with a finger push for advancing the clips along the guide to operative relation with reference to said affixing means.

11. A device of the character described, comprising a clip magazine, and clip affixing members operative at the forward end thereof, in combination with a detachable limit stop member mounted on the forward portion of said magazine.

12. Wound clip forceps comprising forceps members and a magazine clip guide, the latter having a guide-way adapted to receive and guide the clips in edgewise alinement in combination with means on the magazine for holding the foremost clip in operative relation to the forceps members and affording clearance space above and below the guide-way to permit the upward bending of the clip and its application to the wound beneath.

13. In a wound clip-applying device, the combination of a magazine clip guide adapted to receive and guide the clips in edgewise alinement, and clip-retaining means at the forward end of the guide including a forward limit stop portion and side portions spaced from each other, in combination with clip-bending members adapted to enter between said limit stop and side portions.

14. A device for applying wound clips, comprising a guide adapted to receive and guide the clips in edgewise alinement, and clip-bending members operative adjacent the end of the guide, in combination with means for holding the foremost clip clear of the guide and in operative relation to the clip-bending members.

15. A device for applying wound clips, comprising a guide adapted to receive and guide the clips in edgewise alinement, and clip-bending members operative adjacent the end of the guide, in combination with means for holding the foremost clip clear of the guide and in operative relation to the clip-bending members, said means including laterally spaced portions adapted to engage the top of the clip to prevent upward dislodgment thereof.

16. A device for applying wound clips, comprising a guide adapted to receive and guide the clips in edgewise alinement, and clip-bending members operative transversely adjacent the end of the guide, in combination with clip-retaining fingers spaced from the sides of the guide and projecting forward in converging relation beyond the end thereof.

17. A device for applying wound clips, comprising a central slotted bar constituting a magazine guide for the clips, and clip-bending members operative transversely in front of the end of said bar, in combination with a detachable clip-retaining member applied to the forward part of said bar and having laterally spaced stop portions and side portions adapted to retain the foremost clip at its front and ends.

18. In wound clip forceps, the combination with a central member adapted to support and guide a plurality of clips, forceps members adapted to grasp and bend the clips, and steadying devices on said forceps members.

19. A device of the character described, comprising clip-bending members, and a central relatively stationary bar adapted to support and guide a plurality of clips successively into operative relation to said clip-bending members, and having its under side hollowed out at the front to receive the lips of the wound.

20. A device of the character described, comprising clip-bending members, and a relatively stationary central member adapted to support and guide the clips successively into operative relation to said bending members, in combination with a clip-retaining attachment having means holding it to the top of said central member and arms extending beneath the same.

21. In an instrument of the class described, the combination of a pair of lateral forceps members and a central clip magazine and guide supporting such members and provided with a straight clip-guiding slot adapted to receive the backs of the clips and through which the clips are advanced to the action of the forceps members.

22. In an instrument of the class described, the combination of a central magazine member slotted to receive the backs of the clips and lateral forceps members, of means for sustaining the terminal clip in position to be bent by the forceps members and means for protecting the succeeding clips from contact with the surface being operated upon.

23. In an instrument of the class described, the combination of a clip magazine and guide, means at the forward end thereof to retain the terminal clip in position for application to the wound, such means being removable from the magazine and provided with one or more devices for alining it with the guide slot in the magazine.

24. In an instrument of the class described, clip-bending forceps members, and a central magazine having a clip guide slot therein to receive the backs of the clips, in combination with means for sustaining the terminal clip free of said slot, such means engaging only the terminal portions of the clip whereby the central portion is free to bend or buckle under the action of the forceps members.

25. An instrument of the class described, comprising a central magazine clip and guide member having a pair of spring forceps members permanently mounted thereon, a removable clip-positioning member at the forward end of said magazine adapted for removal to provide access to said magazine, and a pusher in the magazine adapted to advance the clips into said sustaining member where they will be subject to the bending action of the forceps members.

26. A device for applying wound clips, comprising a central relatively stationary support embodying a straight longitudinal guide-way constructed to hold the clips in edgewise alinement, and forceps members carried by said support and operative in plane parallel with the guide-way to bend and apply the foremost clip.

27. A device for applying wound clips, comprising a central relatively stationary support embodying a longitudinal guide-way constructed to hold the clips in edge to edge series, and forceps members carried by said support and operative to bend and apply the foremost clip, said forceps members operating in a plane parallel with the back of said clip.

28. A device for applying wound clips, comprising a central relatively stationary support embodying a longitudinal guide-way constructed to hold the clips in edge to edge series, means for arresting and positioning the foremost clip, and forceps members carried by said support and operative to bend and apply the clip thus held at the forward end of the guide, said forceps members operating in a plane substantially parallel with the back of the clip to be applied.

29. A wound clip forceps device, comprising a magazine constructed to hold and guide the clips in edge to edge series, means for bending and applying the foremost clip, and clip-arresting and positioning means at the forward end of the magazine affording clearance allowing the clip when collapsed to buckle at right angles to the plane of the guide.

30. A device for applying wound clips, comprising a support embodying a magazine constructed to hold and guide the clips in edgewise series, and forceps members carried by the support in relation to bend and apply successive clips, the forward portion of the support being formed with a limit stop to arrest the foremost clip and being cut out at the stop to allow clips to buckle when collapsed by the forceps members.

In testimony whereof, I have signed this specification in the presence of two witnesses.

GUSTAV F. RICHTER.

Witnesses:
   H. G. KIMBALL,
   G. A. TAYLOR.